US006662086B2

(12) United States Patent
Lemelson et al.

(10) Patent No.: US 6,662,086 B2
(45) Date of Patent: Dec. 9, 2003

(54) FUZZY LOGIC BASED EMERGENCY FLIGHT CONTROL WITH THRUST VECTORING CAPABILITY

(76) Inventors: Jerome H. Lemelson, deceased, late of Incline Village, NV (US); by Dorothy Lemelson, executrix, PMB #284, 930 Tahoe Blvd., #802, Incline Village, NE (US) 89451; Robert D. Pedersen, 7808 Gleneagle Dr., Dallas, TX (US) 75248; Tracy D. Blake, 14641 N. 49th Pl., Scottsdale, AZ (US) 85254

( * ) Notice: Subject to any disclaimer, the term of this patent is extended or adjusted under 35 U.S.C. 154(b) by 22 days.

(21) Appl. No.: 09/884,341

(22) Filed: Jun. 18, 2001

(65) Prior Publication Data

US 2001/0044680 A1 Nov. 22, 2001

Related U.S. Application Data

(63) Continuation of application No. 09/405,570, filed on Sep. 25, 1999, now Pat. No. 6,259,976.

(51) Int. Cl.$^7$ .................................................. G05D 1/00
(52) U.S. Cl. ................................. 701/3; 701/4; 701/14; 701/200; 701/213; 340/988; 73/178 R
(58) Field of Search ............................ 701/3, 4, 14, 40, 701/44, 200, 213, 215; 340/988, 993, 994; 73/170 R (56) References Cited

U.S. PATENT DOCUMENTS

| 4,121,194 A | 10/1978 | Downey et al. ............ 340/959 |
| 4,130,258 A | 12/1978 | Fox .............................. 244/58 |
| 4,317,119 A | 2/1982 | Alvarez ................. 343/112 CA |

(List continued on next page.)

FOREIGN PATENT DOCUMENTS

DE      89/08904      9/1989

OTHER PUBLICATIONS development and simulation of an F/A–18 fuzzy logic automatic carrier landing system.—Marc Steinberg p. 797—802.*
Schwarz, Karl; Flug Revue Online www.flug–flue.rotor-.com; "ITP Develops Thrust–Vectoring Nozzle for EJ200"; Apr. 1997; p. 61.
Navstar GPS Related Acronyms and Abbreviations; www.u-texas.edu/depts/grg/gcraft/notes/gps/acronym.html; Navigation Information Service Bulletin Board; p. 1–7.

(List continued on next page.)

Primary Examiner—William A. Cuchlinski, Jr.
Assistant Examiner—Olga Hernandez
(74) Attorney, Agent, or Firm—Steven G. Lisa; Douglas W. Rudy; Edwin A. Suominen (57) ABSTRACT

A fuzzy logic based emergency flight control system for an aircraft. The system has a thrust vectoring flight control system, an aerodynamic flight control system, and a fuzzy logic controller. The thrust vectoring flight control system provides thrust to the aircraft in an emergency situation alone or in combination with aerodynamic flight controls. The fuzzy logic controller executes fuzzy logic algorithms for assessing the emergency situation and controlling the aircraft thrust vectoring and aerodynamic flight control systems in the emergency situation. An adjustable nozzle is coupled to an exhaust thrust end of an engine of the aircraft and is angularly adjusted to direct thrust of the aircraft in a determined direction after fuzzy logic controller assessment of the emergency situation. Alternatively, an adjustable panel is mounted to a wing of the aircraft and positionable near an exhaust thrust end of an engine of the aircraft to direct thrust of the aircraft in a determined direction after the fuzzy logic controller assessment of the emergency situation. The fuzzy logic controller further includes a position, attitude, and heading determination system for determining position, attitude, and heading of the aircraft. The position, attitude, and heading determination system further includes global positioning system receivers mounted at extremities of the aircraft and a determination processor coupled to the global positioning receivers for calculating and assessing position, attitude, and heading of the aircraft.

15 Claims, 7 Drawing Sheets

U.S. PATENT DOCUMENTS

| | | | |
|---|---|---|---|
| 4,726,545 A | 2/1988 | Kress | 244/12.3 |
| 4,835,537 A | 5/1989 | Manion | 342/30 |
| 4,840,329 A | 6/1989 | Szuminski et al. | 244/12.5 |
| 5,005,133 A | 4/1991 | Takahashi | 701/98 |
| 5,119,091 A | 6/1992 | Zweifel | 340/968 |
| 5,243,339 A | 9/1993 | Graham et al. | 340/945 |
| 5,325,302 A | 6/1994 | Izidon et al. | 364/461 |
| 5,381,140 A | 1/1995 | Kuroda et al. | 340/961 |
| 5,390,877 A | 2/1995 | Nightingale | 244/23 D |
| 5,414,631 A | 5/1995 | Denoize et al. | 364/461 |
| 5,450,329 A | 9/1995 | Tanner | 364/449 |
| 5,457,634 A | 10/1995 | Chakravarty | 701/3 |
| 5,471,559 A | 11/1995 | Yasuunobu et al. | 706/52 |
| 5,481,648 A | 1/1996 | Volponi | 706/45 |
| 5,497,157 A | 3/1996 | Gruener et al. | 342/36 |
| 5,524,827 A | 6/1996 | Znamensky et al. | 239/265.33 |
| 5,543,804 A | 8/1996 | Buchler et al. | 342/357 |
| 5,548,293 A | 8/1996 | Cohen | 342/357 |
| 5,570,095 A | 10/1996 | Drouilhet, Jr. et | 342/357 |
| RE35,387 E | 12/1996 | Strom | 244/75 R |
| 5,596,332 A | 1/1997 | Coles et al. | 342/455 |
| 5,601,256 A | 2/1997 | Harris | 244/52 |
| 5,610,815 A | 3/1997 | Gudat et al. | 364/424.027 |
| 5,628,272 A | 5/1997 | Thomas | 114/285 |
| 5,636,123 A | 6/1997 | Rich et al. | 364/461 |
| 5,638,282 A | 6/1997 | Chazelle et al. | 364/461 |
| 5,680,755 A | 10/1997 | Hauer et al. | 60/266 |
| 5,687,907 A | 11/1997 | Holden | 239/265.35 |
| 5,690,280 A | 11/1997 | Holowach et al. | 239/265.25 |
| 5,706,649 A | 1/1998 | Robinson et al. | 60/226.2 |
| 5,710,559 A | 1/1998 | Krogmann | 340/963 |
| 5,714,948 A | 2/1998 | Farmakis et al. | 340/961 |
| 5,719,898 A | 2/1998 | Davidovici et al. | 375/200 |
| 5,740,047 A | 4/1998 | Pilley et al. | 364/439 |
| 5,757,317 A | 5/1998 | Buchler et al. | 342/357 |
| 5,769,317 A | 6/1998 | Sokhey et al. | 239/1 |
| 5,782,431 A | 7/1998 | Gal-Or et al. | 244/52 |
| 5,793,329 A | 8/1998 | Nakada et al. | 342/357 |
| 5,913,916 A | 6/1999 | Bai et al. | 701/59 |
| 5,922,035 A | 7/1999 | Chen | 701/22 |
| 5,937,940 A | 8/1999 | Davis, Jr. et al. | 165/202 |
| 5,983,161 A | 11/1999 | Lemelson et al. | 701/301 |
| 5,984,228 A | 11/1999 | Pham | 244/2 |
| 6,055,477 A | 4/2000 | McBurney et al. | 701/207 |
| 6,246,320 B1 * | 6/2001 | Monroe | 340/506 |
| 6,253,064 B1 * | 6/2001 | Monroe | 455/66 |
| 6,259,976 B1 * | 7/2001 | Lemelson et al. | 701/3 |
| 6,271,768 B1 * | 8/2001 | Frazier et al. | 340/961 |
| 6,459,411 B2 * | 10/2002 | Frazier et al. | 342/455 |

OTHER PUBLICATIONS

Flight 2000/Appendix A, Acronym List; www.nasi.hq.faa.gov/nasiHTMS/f2000/APPA; Jun. 29, 1998.

Bingham, Lieutenant Colonel Price T; Improving Force Flexibility Through V/STOL; www.cdsar.af.mil/aureview/1985/jan–feb/bingham.thml.

Rudel, Marc–Philippe/Baldwin, Jonathan, "GPS Relative Accuracy for Collison Avoidance", *1997 ION*; Presented at the Institute of Navigation Technical Meeting in Santa Monica, CA, Jan. 1997.

Whitlock, Kelli; www.ohio–state.edu/units/research/archive/gps1; "Space–Age Technology Improves Bulldozer Operations".

Wilson, David L.; www.erols.com/dlwilson/gps; "Global Position System Accuracy".

Kuykendoll, Regina L.; www.cbu.edu/~ pong/624rkjl; "Expert Systems in GPS Surveying".

Leung, Kit/Wu, Darren; www.minmet.uq.oz.au/~ djwwu/e4413; "Thrust Vectoring for Turbine Engines".

Ladkin, Peter B.; www.rvs.uni–bielefeld.de/~ ladkin/Reports/CFIT; "Controlled Flight Into Terrain: What Is Being Done"; Aug. 21, 1997, Revision Sep. 15, 1997.

www.naveen.uscg.mil/policy/frp1996/frpA–1; Appendix A; Systems Descriptions.

www.naveen.uscg.mil/policy/frp3–1; Radionavigation System Use.

Verplaetse, Chris; verp.www.media.mit.edu/people/verp/projects/SmartPen/node6; "Basic Inertial Navigation Systems (INS)"; May 26, 1995.

Home.sprynet.com/sprynte/mmellott/inertial; Inertial Navigation; Sep. 14, 1996.

Verplaetse, Chris; verp.www.meida.mit.edu/people/verp/projects/SmartPen/node9; "Advantages and Disadvantages of Gimbaled vs. Strapdown"; May 26, 1995.

Verplaetse, Chris; verp.www.media.mit.edu/people/verp/projects/SmartPen/node8; Strapdown Systems; May 26, 1995.

Verplaetse, Chris; verp.www.meida.mit.edu/people/verp/projects/SmartPen/node7; "Gimbaled Systems"; May 26, 1995.

www.seisland.com/mapping; Seisland—Services and Products/GIS Mapping Services.

www.cca.rockwel.com/genav/news/vantagepoint/vp3n4; Vantage Point, vol. 3, No. 4; "How Fliers Fly Drives Flight Deck Innovation".

206.205.144.3/hardtasf; "SY–200 Traffic Alert System".

www.nasi.hq.faa.gov/nasiHTML/RED/red97/97–3; "Communications and Applications"; NASI–R,E&D Plan 1997, Chapter 3.

www.faa.gov/and/and300/datalink/navsur/cdti 1; "Cockpit Display of Traffic Information Project Plan".

206.205.14.3/decoderf; SH–100/200 Radar Decoders.

Newby, Simon/Corcoran, Wendy; "What's New from NovAtel"; *ION GPS–95*; Palm Springs, Sep. 12–15, 1995.

Hundley, Warren/Rowson, Dr. Stephen/Courtney, Glenn; Flight Evaluation of a Basic C/A Code Differential GPS for Category 1 Precision Approach; Wilcox Electric, Inc.

Smith, Alexander E./Baldwin, Jonathan C.; "Cockpit Display of Traffic Information Using GPS–Design of a Low Cost System for General Aviation"; Rannoch Corporation; Presented at the 37th Annual Aircraft Electronics Association Convention May 1994.

Trimble Differential GPS; www.trimble.com/gps/nfsections/diffGOS/aa_dg4; "Where Do We Get Differential Corrections?".

Melton, Randy; www.dredgemag.com/novdec/baybridge; "Using Real Time Kinematic GPSon a Heavy Marine Construction Project: The Chesapeake Bay Bridge/Tunnel".

www.techmall.cam/techdocs/NP970718–2; New Product Release—"Trimble Announces High Accuracy Real–Time Mapping System".

tycho.usno.navy.mil/pub/gps/gpssy; United States Naval Observatory Automated Data Service; "GPS System Description".

tycho.usno.navy.mil/pub/gps/gpstt; United States Naval Observatory Automated Data Service; "GPS Time Transfer Performance".

Dana, Peter H.; www.utexas.edu/depts/grg/gcraft/notes/gps; "Global Positioning System Overview"; Jun. 30, 1998.

www.comsysin.com/faq/007; FAQ Pages for CommSystems Intermountain(GPS); "What is "DGPS" and Which Receivers Can Use It?"; Jul. 24, 1997.

Trimble; www.trimble.com/gps/nfesections/whatisGPS/aa_wa1; "What is GPS?".

www.navcen.uscg.mil/policy/frp1996/frp3–6 through frp3–24.

www.crasys.anu.edu.au/admin/annualReports/1995–96/7–10; "Global Positioning Systems/Inertial Navigation Systems Integration Project".

Web page printed from http://humvee.net/hid/acc/gps.html on Sep. 22, 2000; HUMVEE.NET; "Accessories/GPS and Electronic Mapping".

Web page printed from http://206.205.144.3/hardtasf on Jul. 7, 1998; "SY–200 Traffic Alert System".

Whitlock, Kelli; Web page article printed from http://www.ohio–state.edu/units/research/archive/gpsl on Jun. 18, 1998; "Space–Age Technology Improves Bulldozer Operations".

* cited by examiner

Fig. 1a

Fig. 1b air speed = very low

| altitude / wind shear | very low | low | medium | high | very high |
|---|---|---|---|---|---|
| very weak | very steep | steep | steep | medium | medium |
| weak | very steep | steep | steep | medium | medium |
| medium | very steep | very steep | steep | steep | medium |
| strong | very steep | very steep | very steep | steep | steep |
| very strong | very steep | very steep | very steep | very steep | steep |

Fig. 2a air speed = low

| altitude / wind shear | very low | low | medium | high | very high |
|---|---|---|---|---|---|
| very weak | very steep | steep | medium | medium | low |
| weak | very steep | steep | medium | medium | medium |
| medium | very steep | steep | steep | medium | medium |
| strong | very steep | very steep | steep | steep | medium |
| very strong | very steep | very steep | very steep | steep | steep |

Fig. 2b

| Air Speed \ Distance to Object | very close | close | medium | far | very far |
|---|---|---|---|---|---|
| very low | high | medium | medium | low | low |
| low | high | high | medium | medium | low |
| medium | high | high | medium | medium | low |
| high | high | high | medium | medium | low |
| very high | high | high | high | medium | medium |

| Vert. Accel. \ Altitude | very low | low | medium | high | very high |
|---|---|---|---|---|---|
| very low | medium | medium | low | low | very low |
| low | high | high | medium | low | low |
| medium | high | high | medium | medium | low |
| high | very high | very high | high | high | medium |
| very high | very high | very high | very high | high | high |

FUZZY LOGIC BASED EMERGENCY FLIGHT CONTROL WITH THRUST VECTORING CAPABILITY

CROSS-REFERENCE TO RELATED APPLICATIONS

This application is a continuation, of application Ser. No. 09/405,570, filed on Sep. 25, 1999, now U.S. Pat. No. 6,259,976, commonly owned.

FIELD OF THE INVENTION

The invention relates to flight control of aircraft and, more particularly, to fuzzy logic based emergency flight control with thrust vectoring capability.

BACKGROUND

Sophisticated flight control systems are required to handle the complex requirements of modern aircraft flight. As the number of aircraft and the percent utilization of aircraft, specifically takeoffs and landings, increases, air traffic control (ATC) becomes more complicated. Heightened sensitivity and awareness of the importance of preventing mid-air collisions and other accidents increases with the increase in air traffic. Air traffic increases have resulted in more numerous flight paths and less aircraft spacing. The demands put on aircraft navigation systems have correspondingly increased.

Typically, transport aircraft use conventional aerodynamic flight control (AFC) methods that involve maneuvering the aircraft by means of the aircraft control surfaces. These control surfaces, such as the ailerons, elevators, and rudders, manipulate airflow to allow for modification of the aircraft flight path. Maneuverability of an AFC based aircraft with a fixed thrust direction is controlled, to a lesser degree, by changing engine thrust magnitudes. An increased research effort is being placed on modifying the direction of the engine thrust by nozzle redirection capabilities or external adjustable vanes. Controlling thrust direction is known as thrust vectoring. See U.S. Pat. Nos. 5,782,431; 5,769,317; 5,687,907; 5,628,272, each of which is incorporated herein by reference.

Thrust vectoring allows for much greater control of an aircraft and has been studied extensively for use in military applications. Inhospitable conditions demand flexibility in the ability of the military to make use of various runway lengths for aircraft. When the only runway available is very short, the need exists for an aircraft that is able to perform vertical or short takeoffs and landings. The McDonnell Douglas/British Aerospace AV-8B Harrier II is a military aircraft that is capable of such maneuvers. Aircraft with variable type thrust delivery systems are capable of vertical or short takeoffs and landings.

Commercial aircraft do not incorporate hardware for producing a vertical thrust component. In normal aircraft operating environments, with adequate runway lengths and the like, there has not been a need for thrust vectoring. The exception is the use of thrust deflectors that are deployable upon landing to assist in slowing of the aircraft after touchdown. However, the inventor's believe that there is an unfulfilled need to improve collision and meteorological hazard responsiveness in aircraft in general and in commercial aircraft in specific.

Aircraft are very safe modes of transportation but there is always the chance that an aircraft may be involved in a collision with another aircraft, lose altitude unexpectedly or impact an object fixed to the ground.

"Controlled Flight into Terrain" is a term used to describe a situation where an aircraft, under control of the crew, is flown into terrain, an obstacle or water, with no prior awareness on the part of the crew of the impending collision. Avoidance of this type of mishap is addressed in this invention.

Another mishap this invention seeks to avoid is the loss of control of the aircraft due to weather and atmospheric phenomenon. Aircraft experiencing turbulence, in particular wind shear, are at risk to sudden changes in altitude. These sudden changes in altitude are, at the minimum, uncomfortable to passengers and crew and if radical will jeopardize the safety of the aircraft itself. This danger is more pronounced at takeoff and landing when the aircraft is at low altitude. The aircraft can lose altitude rapidly and possibly impact the ground due to the effects of wind shear.

Wind shear is a natural phenomenon that occurs primarily during thunderstorms. A large downburst of cold, dense air associated with a frontal system hits the surface of the earth and spreads horizontally undercutting the warmer air outside the zone of the cold air downburst. The mixing of the cold and warm air produces a rolling vortex and causes high velocity winds to surge in opposite directions. This phenomena is wind shear. The hazard presented by wind shear, according to the National Transportation Safety Board (NTSB), has, directly or indirectly, contributed to approximately fifty percent of all commercial airline fatalities between 1974 and 1985. The NTSB has determined that over six hundred lives have been lost since 1964 due to the effects of wind shear.

To help alleviate the problem caused by wind shear, all commercial carriers were required to install some form of wind shear detection/avoidance system on their aircraft by 1995. Various sensing hardware and techniques are available for an aircraft to determine if it is in a hazardous turbulence or wind shear condition. Methods and apparatuses designed for wind shear detection, such as Doppler radar, have been developed. Methods and apparatuses for position and attitude sensing, as well as wind shear detection, are necessary for the implementation of an aircraft stabilizing system. Various configurations of wind shear detection may be found in U.S. Pat. Nos. 5,050,087; 5,406,489; 5,648,782; 5,523,759; 5,093,662, each of which is incorporated by reference herein.

Collision avoidance is one consideration of flight control systems. Collision avoidance schemes are largely dependent on efforts of air traffic controllers tracking aircraft traffic. When a potential danger became evident or was detected, the air traffic controller would notify each of the aircraft involved and provide alternative flight paths. With the increase in volume of air traffic, the air traffic controller's responsibilities have increased as well. What was once an acceptable and manageable technique for managing the volume of aircraft has become less manageable. Aircraft intercommunications or ground based monitoring stations in conjunction with on board collision avoidance systems have provided for more effective collision avoidance infrastructure.

GPS based air traffic control and collision avoidance systems are disclosed in U.S. Pat. Nos. 5,740,047; 5,714,948; 5,638,282; 5,636,123; 5,610,815; 5,596,332; 5,450,329; 5,414,631; 5,325,302; 5,153,836; and 4,835,537, each of which is incorporated herein by reference.

Emergency control using thrust vectoring has been proposed for transport aircraft (U.S. Pat. No. 5,782,431). This patent only describes the apparatus and its operation and does not disclose any system for detection of the need for thrust vectoring. Specifically, it does not include any method of automatic control in the event of a dangerous situation that may require an immediate action faster than a manual response implemented by the flight crew. The system disclosed herein implements a fuzzy logic based control scheme to analyze the danger level and appropriately engage the thrust vectoring system, in conjunction with automatic flight control measures, for aircraft stabilization or collision avoidance.

Fuzzy logic is a well known and developed logic system which is a superset of Boolean logic. Since the world is primarily analog in nature, many situations cannot be analyzed in a simple binary analysis. Simply concluding that an event, element or condition is either "X" or is not "X" is seldom adequate in making a complex decision. For example, an aircraft's altitude cannot simply be distinguished by low or not low, high or not high. There are other factors that need to be factored into the equation. For instance, an aircraft that is flying at twelve thousand feet altitude is not necessarily "low" but in a mountainous region with peaks extending to twelve thousand feet "low" takes on a relevant new meaning. Fuzzy logic systems are designed to deal with these nuances and assist in decision output results dependent on a set of operating rules.

Bivalent Set Theory is limiting as a decision making system, when attempting to model problems involving "humanistic" issues, because membership in bivalent sets is mutually exclusive. To provide a level of utility beyond that resulting from Bivalent Set Theory the theory of Fuzzy Logic or Fuzzy Set Theory was developed. Fuzzy Set Theory provides for membership in more than one set thus allowing a transition band from one set to another. As an example, instead of saying the air speed of an aircraft went from medium to fast in a change of 1 knot/hour (400 knots=medium, 401 knots=fast), the fuzzy set theory permits the change to happen over 10, 20, or 30 knots. This represents a transition band where the speed has membership (of magnitude less than 1) in both the medium and fast sets.

If the current flight status (pilot commands, altitude, air speed, engine thrust magnitude, nozzle angle, etc.) and external weather conditions (wind speed, wind shear magnitude, etc.) of an aircraft are known, a fuzzy logic controller is able to make rapid decisions as to the magnitude of a hazardous situation. The fuzzy logic controller can also determine what corrective actions should be taken.

Providing fuzzy logic controllers with the ability to automatically engage both conventional aerodynamic flight control (CFC) and thrust vectoring flight control (TVFC), the fuzzy logic controller is able to make decisions as to what combination of the two flight control systems would best handle the hazardous situation.

Sophisticated systems for determining aircraft position exist and continue to be developed. Such systems are especially important to an emergency flight control system for controlling an aircraft in an emergency situation. One of the aeronautical navigation or geographic positioning technologies that exists for determining aircraft position is the global positioning system (GPS). In addition other navigation aid systems are available. For instance, the global orbiting navigation satellite system (GLONASS) is a system that is currently in use.

The core of GPS is a constellation of twenty-four (24) satellites which continuously transmit information that are used by GPS based navigation equipment for position determination. Using differential GPS (DGPS), very accurate position information is attained for navigation and other flight control functions. Various GPS based navigation techniques that are used in conjunction with this invention include U.S. Pat. Nos. 5,570,095; 5,548,293; 5,543,804, each of which is incorporated by reference herein. Since GPS systems provide very accurate and precise information as to the aircraft's location, then GPS systems are desirable systems that may be integrated into subsystems that can be used for flight control and/or emergency control of an aircraft.

There is an industry need for an improved flight control system for controlling an aircraft in emergency situations or for use in hands-off flight situations. The present invention discloses and provides a fuzzy logic based emergency flight control system with thrust vectoring and aerodynamic flight control capabilities, and the present invention overcomes the problems, disadvantages, and limitations of the prior art.

SUMMARY OF THE INVENTION

This invention provides for a fuzzy logic based emergency flight control and warning system using GPS position information and incorporating both aerodynamic flight control and thrust vectoring flight control techniques. Although not directed exclusively to emergency flight control systems, such emergency systems will be discussed in depth herein, however, this disclosure is intended to cover non-emergency flight controls as well.

In this invention a fuzzy logic system is used to make important decisions concerning the flight trajectory of an aircraft. The decisions include those concerned with, for example, the magnitude of danger that exists and what type of corrective action should be taken to alleviate the dangerous situation. Corrective action, triggered by the fuzzy logic controller, includes using aerodynamic flight control methods, thrust vectoring flight control methods, or a combination of the two systems. The invention also contemplates the use of data from an air traffic control system that uses position information derived from the GPS receivers. Such information will be input data to the fuzzy logic system. Based on the information input from the air traffic control system the fuzzy logic controller determines if other aircraft in the area pose a safety threat.

Air traffic control systems use bidirectional radio communications for transmitting information between aircraft or ground monitoring stations. A terrain map containing information of ground objects (buildings, trees, mountains, and the like) provides information to the fuzzy logic controller. This information is used in the determination of the magnitude of danger that may exist relative to the aircraft with respect to ground objects.

The fuzzy logic controller of this invention uses GPS receivers located on the extremities of the aircraft to provide input for position, attitude, heading, and speed calculations. GPS has been developed for a variety of applications and uses. Differential GPS receivers have also been developed and currently have the ability to resolve a receiver position to an accuracy of one centimeter. Differential GPS relies upon ground based correction stations having an exact known position to provide differential GPS receivers information about the distortion of the satellite signals. The proposed invention provides emergency flight control measures to prevent aircraft accidents, which requires precise position and attitude information for proper operation of the system. The flight information provided by the GPS receivers is also used in the air traffic control system when notifying other aircraft about a first aircraft's position and heading.

This invention contemplates and discloses simultaneous use of aerodynamic flight control surfaces and thrust vectoring controls using adjustable engine nozzles or separate vanes/panels for flight and/or emergency control. The thrust vectoring aspect of flight control provides contemporary aircraft more flexibility in flight control options. This includes both aerodynamic flight control and the ability to provide thrust components in more than one direction, including thrust reversing which is useful in slowing the aircraft. Generally, thrust from the engines of the aircraft is redirected in a manner that provides a vertical component of thrust giving an aircraft a shorter takeoff and landing capability. Such thrust vectoring also provides enhanced protection from hazardous situations such as wind shear and turbulence. It is contemplated that thrust vectoring may also be used to avoid mid-air collisions between aircraft.

The fuzzy logic controller of this invention takes input from various aircraft sensors, including GPS receivers, air traffic control facilities, and also the terrain map, to determine if the aircraft is in a dangerous situation. The fuzzy logic controller implements rule based "if-then" algorithms making constant calculations to determine the magnitude of danger that may exist and what actions to take to alleviate the danger. For example, if aircraft experiences wind shear on takeoff, the danger level is extremely high due to the low altitude of the aircraft and minimal time available to correct the situation. In such a situation the fuzzy logic controller, after issuing a warning notification to the flight crew, decides either to take immediate action (automatic flight control) by implementing the necessary thrust vectoring and/or aerodynamic flight control measures or to leave aircraft control in the hands of the crew. The automatic flight control action taken to prevent unfortunate consequences resulting from wind shear will be extreme because of the proximity to the ground and low air speed. These extreme measures may be uncomfortable to the passengers but may save lives by causing the aircraft to recover from the wind shear incident. In another type of situation, an aircraft experiencing severe turbulence at thirty thousand feet, the time available for the crew to take action to recover from a sudden loss of altitude is usually adequate. Thus the fuzzy logic controller may not necessarily dictate automatic flight control and most likely will not dictate extreme corrective measures. The fuzzy logic controller in this case may determine either to allow the flight crew to handle the problem or decide that it is able to improve the situation by the immediate and automatic application of the necessary aerodynamic flight control and thrust vectoring flight control measures. The reason for some degree of automatic flight control would be to smooth the turbulence effects and improve the quality of the passenger flight. In one variation of the high altitude circumstance, that being a situation wherein a second aircraft is determined to be proximate the first aircraft due to a sudden loss of altitude, the fuzzy logic controller may dictate that pilot control be superseded by automatic flight control at the direction of the fuzzy logic controller.

The use of both aerodynamic flight control and thrust vectoring flight control measures increases the overall ability of the aircraft to avert hazardous or dangerous situations and improve the flight quality for the benefit of the passengers.

The invention also incorporates an air traffic control system, which broadcasts the position of a first aircraft and receives position information of all aircraft in a specific region. A two-way radio system provides the communications between aircraft and a ground monitoring station. Information from the air traffic control system is displayed to the flight crew and is also monitored by the fuzzy logic controller to determine if a potential threat to the first aircraft exists.

A terrain mapping system is also used as an input to the data processing in the fuzzy logic system. The terrain map provides information to the fuzzy logic controller about all ground-based objects in the area or flight path of the aircraft. The terrain map also includes information about the position of all geographic objects such as hills, mountains, trees, buildings, towers, power lines, signs, and like hazards. The map of all ground-based objects provides critical accident prevention information when conditions require flying an aircraft by instruments alone (IFR). If the fuzzy logic controller detects the aircraft approaching an object identified in the terrain map, it immediately provides the flight crew with a warning of the level of danger or automatically takes immediate emergency flight control measures to prevent an impending collision.

Warning indicators on board the aircraft provide the flight crew with the current status of flight situations or conditions. The warning indicators may be one of many alarm options to provide the flight crew with information about possible hazardous or dangerous situations. Warnings are both visual and audible. Audible warnings may be in the form of simple tones, intense alarms, or synthetic speech, to provide important flight crew hazard warning if the flight crew's attention has been diverted from the visual warning system.

It is an object of this invention to provide a fuzzy logic based control system that makes determinations of the magnitude of a hazardous or dangerous situation, that an aircraft may be experiencing. The control system includes a fuzzy logic controller that receives a plurality of inputs from the various aircraft sensors, including GPS receivers, an air traffic control facility, and terrain map of ground based objects.

It is another object of this invention to implement the fuzzy logic controller using if-then inference rule base fuzzy logic algorithms. The fuzzy logic controller determines the level of danger that exists and what corrective measures needs to be taken to avert a disaster or dangerous situation.

It is another object of this invention to make use of both aerodynamic flight control and thrust vectoring flight control for stabilizing an aircraft in dangerous or emergency situations. The fuzzy logic controller makes the determination of when and to what extent the two flight control systems are used in different dangerous or emergency situations.

It is an object of this invention to use GPS receivers located at optimal locations about the extremities of the aircraft to provide critical position, heading, and speed information for input to the fuzzy logic controller and air traffic controller functions.

It is an object of this invention to implement an air traffic control system that provides inputs to the fuzzy logic controller, which is processed to make determinations of dangerous or hazardous flight situations such as possibilities of mid-air collisions with other aircraft in the area. The system transmits and receives GPS navigation information directly from other aircraft or ground monitoring stations. The air traffic control system displays traffic information about all aircraft in a given area.

It is an object of this invention to implement automatic flight control measures when necessary. When a hazardous or dangerous condition is detected by the fuzzy logic controller and the aircraft is not being properly controlled to avoid the condition or the flight danger is imminent, the fuzzy logic controller performs the necessary emergency flight control measures, aerodynamic flight control, and/or thrust vectoring flight control to prevent an accident or dangerous situation.

It is another object of this invention to use a terrain map to provide input about ground based objects to the fuzzy logic controller. The terrain map is a geographic information system providing critical information about the position and size of ground-based objects including mountains, buildings, towers, trees, and the like. When the fuzzy logic controller detects a possible danger with an object on the ground, it may take the necessary danger/emergency aerodynamic flight control and/or thrust vectoring flight control measures or it may simply alert the flight crew if the danger is not imminent.

The above objects and advantages of the invention are achieved by a fuzzy logic based emergency flight control system for an aircraft. The system has a thrust vectoring flight control system and a fuzzy logic controller. The thrust vectoring flight control system provides thrust to the aircraft in an emergency situation. The fuzzy logic controller executes fuzzy logic algorithms for assessing the emergency situation and controlling the aircraft in the emergency situation. An adjustable nozzle is coupled to the engines of the aircraft. The nozzle is adjusted to direct thrust of the aircraft in a determined direction after the fuzzy logic controller has assessed the emergency situation. Alternatively, an adjustable panel is mounted to a wing of the aircraft and can be positioned near the engine exhaust. The panel is can be adjusted to direct thrust of the aircraft in a determined direction after the fuzzy logic controller has assessed the emergency situation.

An aerodynamic flight control system is coupled to the fuzzy logic controller for providing control to the fuzzy logic controller of aerodynamic controls of the aircraft in the emergency situation. The aerodynamic flight control system further includes a control surface system for controlling control surfaces, such as flaps, ailerons, and stabilizers of the aircraft. The fuzzy logic controller further includes a central processing unit which executes algorithms and applications for controlling the aircraft in the emergency situation.

The fuzzy logic controller further includes a position and attitude determination system for determining position and attitude of the aircraft. The position, attitude, and heading determination system further includes global positioning system receivers mounted at extremities of the aircraft and a determination processor coupled to the global positioning receivers for calculating and assessing position, attitude, and heading of the aircraft. The fuzzy logic controller further includes an aircraft position monitoring system, a communications system, a display device, and a terrain map.

The above objects and advantages of the invention are also achieved by a method of using a fuzzy logic based emergency flight control system for an aircraft. A thrust vectoring flight control system is operated for providing thrust to the aircraft in an emergency situation. A fuzzy logic controller that is coupled to the thrust vectoring flight control system is used to execute fuzzy logic algorithms for assessing the emergency situation and controlling the aircraft using the thrust vectoring flight control system in the emergency situation. An aerodynamic flight control system is also coupled to the fuzzy logic controller used for providing control to the aerodynamic controls of the aircraft in the emergency situation. Control surfaces of the aircraft are controlled by the fuzzy logic controller.

The above objects and advantages of the invention are achieved by a fuzzy logic method for controlling an aircraft in an emergency situation. Input variables such as altitude, wind shear, air speed, and proximity parameters related to the aircraft are obtained, and communicated to a fuzzy logic controller. Further input variables may be current thrust magnitude and current thrust angle. The input variables are fuzzified into input fuzzy sets using the fuzzy logic controller. The output variables are converted into output fuzzy sets. The output fuzzy sets are used to calculate crisp output values for controlling the aircraft in the emergency situation. Commands based on the crisp output values are executed, and the commands control the aircraft in the emergency situation.

Inference rule tables, a process component of fuzzy logic, are used to convert the output variables into the fuzzy sets. Total lift required for recovery from the emergency situation is determined and calculated from a sum of thrust from thrust vectoring flight control commands and thrust from aerodynamic flight control commands. A ratio of thrust between the thrust vectoring flight control commands and the aerodynamic flight control commands is determined. The inverse ratio between the aerodynamic flight control commands and the thrust vectoring flight control commands alternatively can be determined. Inference rules are used to determine the total thrust.

The above objects and advantages of the invention are also achieved by an aircraft position, attitude, and heading determination system. The system includes global positioning system receivers mounted at various locations of the aircraft and a determination processor coupled to the global positioning receivers for calculating and assessing position, attitude, and heading of the aircraft. The global positioning system receivers are located at extremities, such as nose of the aircraft, tail of the aircraft, left and right wing tips of the aircraft. The global positioning system receivers and the determination processor also determine angle of attack of the aircraft.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but, in addition, include any and all structures, materials or acts that perform the claimed function, along with any and all known or later-developed equivalent structures, materials or acts for performing the claimed function.

For example, the disclosed system uses GPS for navigation and other functions. The navigation could also be implemented using GLONASS, combination of GPS and GLONASS, or any other navigation system providing the necessary performance.

Likewise, the disclosed system makes use of a thrust vectoring system, in conjunction with aerodynamic flight control measures, to stabilize the aircraft under adverse conditions such as wind shear. This system could be implemented using any suitable thrust vectoring techniques heretofore known or hereinafter developed.

Likewise, there are disclosed several computers, controllers, and systems that perform various control operations. The specific form of the computer, controller, or system is not important to the invention. Any computer, controller or system now known or hereafter known or developed that is capable of performing the functions, processes or methods disclosed herein may be used in the implementation of this invention. In its preferred form, the necessary computing steps or control steps are able to be implemented into existing flight control computers.

BRIEF DESCRIPTION OF THE DRAWINGS

The invention disclosed in this application will be readily understood when considered in conjunction with the following drawings and detailed description of the preferred embodiments. The various hardware and software elements as well as the methods and processes used to carry out the invention are illustrated in the attached drawings in the form of block diagrams, flow charts, and other illustrations. The invention is not limited to the depictions in the drawing figures.

DETAILED DESCRIPTION OF THE DRAWINGS

Figure 7A:
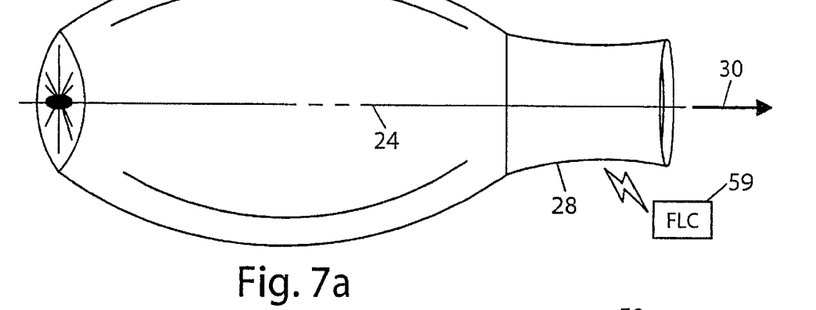
FIG. 7a shows a side view of an adjustable thrust vectoring nozzle in a horizontal thrust position.
Figure 7B:
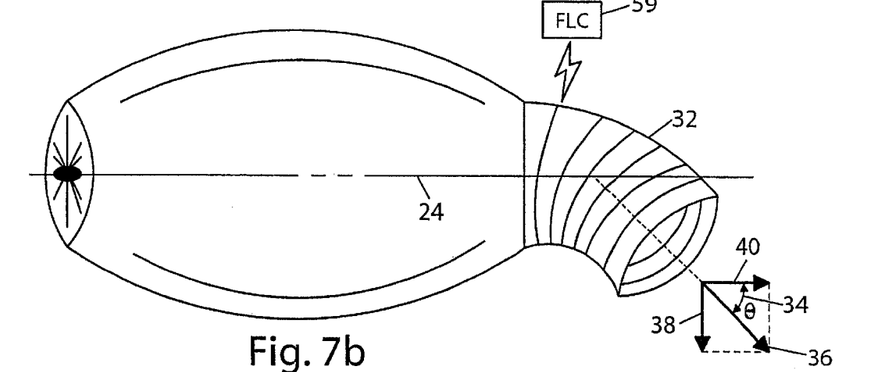
FIG. 7b shows a side view of an adjustable thrust vectoring nozzle in a vertical and horizontal thrust position.

The present invention can be broadly described as an emergency flight control system that uses a fuzzy logic based system to determine actions in furtherance of avoiding the consequences of an emergency. The invention also provides for thrust vectoring capability for use with aircraft using such an emergency flight control system. The proposed fuzzy logic controller (FLC) 59 (which is shown in FIG. 7) is similar to conventional control systems in that it operates on inputs, performs some calculations, and generates an output value. The process that is used is called the Fuzzy Inference Process and is defined by the following three general steps: 1) the fuzzification step which involves crisp data inputs that are translated into fuzzy values; 2) the rule evaluation or inference step which involves the calculation of fuzzy output truth values; 3) the defuzzification step which involves a crisp value that is derived from the fuzzy outputs.

Figure 1A:
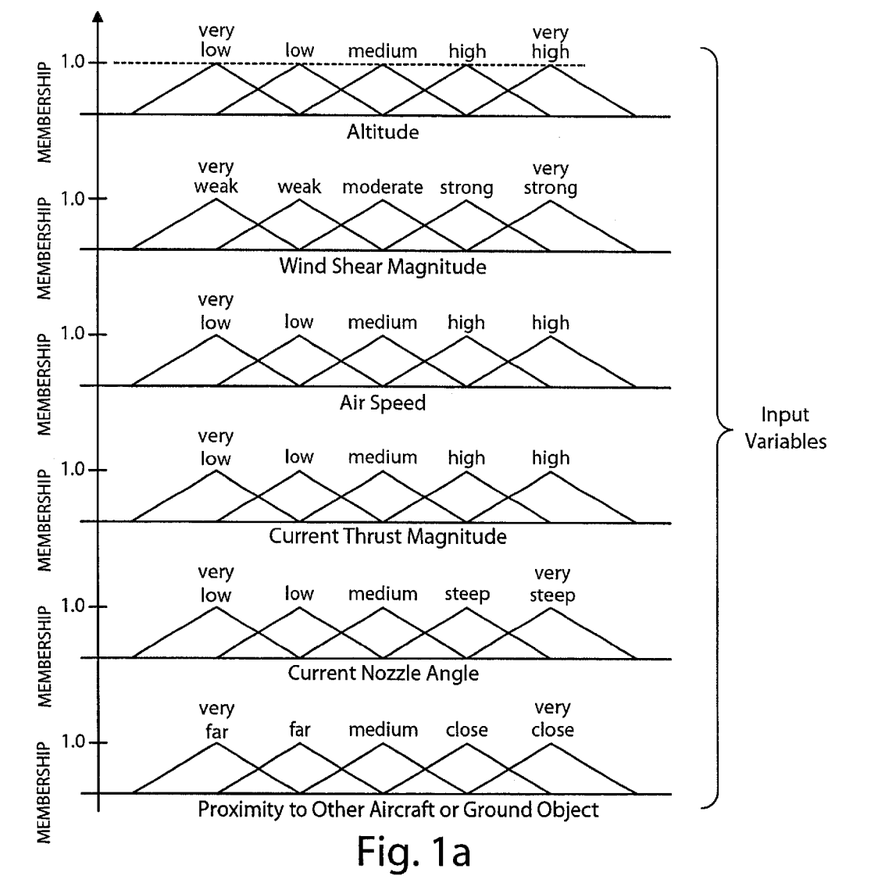
FIG. 1a shows graph diagrams of the fuzzification process for the present fuzzy logic based emergency flight control system with thrust vectoring to convert input variables into fuzzy sets with triangular overlapping membership functions.

FIG. 1a demonstrates the fuzzification process for the input variables altitude, wind shear magnitude, air speed, thrust magnitude, nozzle angle, and proximity to other aircraft or ground objects and output variables of thrust magnitude and nozzle angle. This is only a representative list of possible variables. Many other aircraft parameters that currently exist such as air density, or that come into being in the future such as wind shear angle or direction, may be used in the fuzzy logic process. The individual graph variables are fuzzified into fuzzy sets. The fuzzy set for altitude in FIG. 1a demonstrates triangular (one possible shape) membership functions (fuzzy subsets) for the possible altitude input categories: very low, low, medium, high, very high. The triangular membership functions are overlapping which provides for crisp input values to have membership in more than one of the altitude categories. For example, a specific altitude (crisp input value) may belong to both the medium and high membership functions (or any two adjacent categories). Membership in an input variable category is never greater than one and whenever one category is at a maximum (membership=1), adjacent categories will be at a minimum (membership=0). The set that contains all possible values for a given input variable is referred to as the universe of discourse.

Figure 1B:
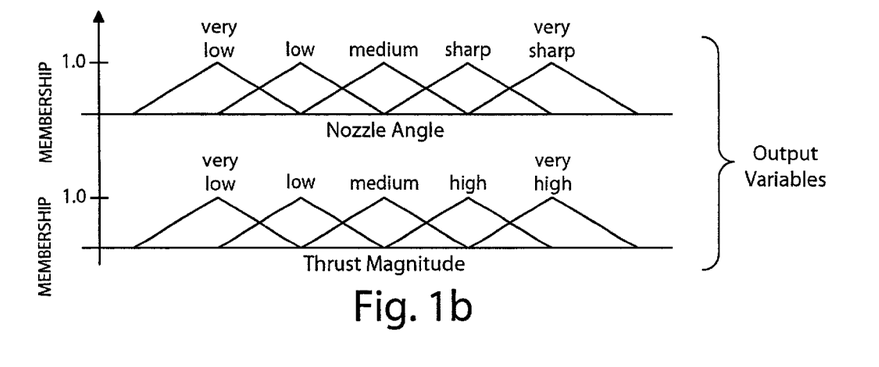
FIG. 1b shows graph diagrams of the fuzzification process for the present fuzzy logic based emergency flight control system with thrust vectoring to convert output variables into fuzzy sets with triangular overlapping membership functions.

Output variables must also be converted to fuzzy sets. FIG. 1b illustrates two possible output variables, which have been fuzzified. Thrust vectoring nozzle angle (TVFC) and thrust magnitude (AFC) have been converted to fuzzy sets, which are used in the defuzzification process to calculate crisp output values after the rule evaluation process has been completed. Other possible TVFC and AFC output variables include: flap angle, aileron angle, engine thrust magnitude, and the like. The output fuzzy sets seen in FIG. 1b demonstrate the ability of the fuzzy logic controller (FLC) to generate both TVFC and AFC output control actions.

Figure 2A:
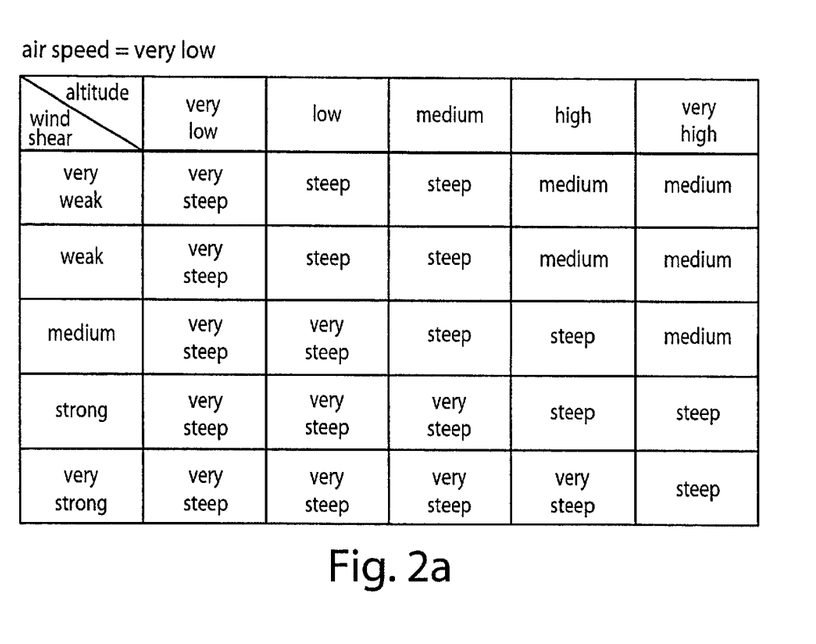
FIG. 2a shows an example of inference rule tables used in the fuzzy logic process for wind shear flight control using the present invention.
Figure 2B:
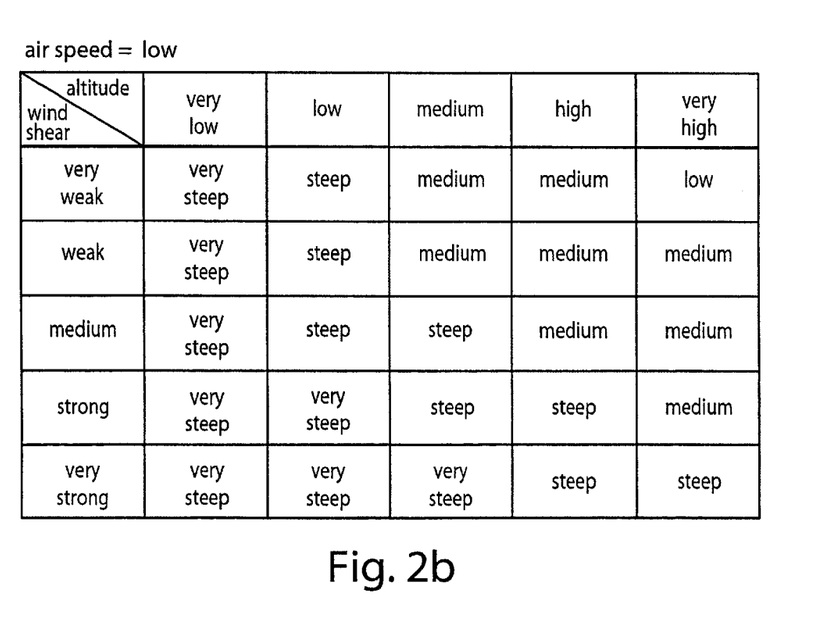
FIG. 2b shows an example of inference rule tables (continuation from FIG. 2a) used in the fuzzy logic process for wind shear flight control using the present invention.

Rule (or knowledge) based if-then statements (inference rules) are defined based upon an in depth knowledge of the aerodynamics of a particular aircraft and the possible dangers the aircraft may encounter. FIGS. 2a–2f illustrate inference rule tables, that are used to evaluate the input variables for air speed, altitude, and wind shear magnitude to produce a TV nozzle angle for the appropriate emergency response in a given hazardous condition. FIG. 2a is the inference rule table for the air speed category of very low demonstrating the rules to be evaluated in a situation such as might be encountered during takeoff or landing in the presence of a wind shear. Categories for altitude of the aircraft are on placed across the top row and the categories for wind shear are placed down the leftmost column. The output variable to be determined is the angle of the thrust vectoring nozzle; the higher the angle the more vertical thrust produced to counteract the downward force of the wind shear. With greater aircraft altitude, less extreme the TV nozzle angles are needed because standard AFC recovery measures at the higher altitude can possibly provide a more effective solution. Examples of rules defined in the rule table of FIG. 2a for very low wind speed are:

a) IF air speed=very low AND altitude=very low AND wind shear mag.=very weak THEN nozzle angle=very steep.

b) IF air speed=very low AND altitude=low AND wind shear mag.=weak THEN nozzle angle=steep.

c) IF air speed=very low AND altitude=very high AND wind shear mag.=medium THEN nozzle angle= medium.

If the air speed is very high, the rules for the same categories of altitude and wind shear magnitude are:

a) IF air speed=very high AND altitude=very low AND wind shear mag.=very weak THEN nozzle angle=steep.

b) IF air speed=very high AND altitude=low AND wind shear mag.=weak THEN nozzle angle=medium.

c) IF air speed=very high AND altitude=very high AND wind shear mag.=medium THEN nozzle angle=low.

The inference rules clearly demonstrate that as the air speed increases, the need for extreme TVFC based emergency measures diminishes. Properly defined inference rules for TVFC and AFC emergency measures allows the two flight control systems to complement each other in avoiding many dangerous situations which would not be possible using just the individual flight control systems.

The inference rules disclosed are exemplary for an aircraft in the situation described above. Detailed inference rules are provided by an expert who has an in depth knowledge of the flight dynamics of a specific aircraft. The expert, or experts, have an intimate knowledge of how the specific aircraft would react to the applied combination of conventional and thrust vectoring control commands issued for the different hazardous situations.

After the rule evaluation process (inference), the degree of truth of the output variables is determined. The output fuzzy sets as shown in FIG. 1b are overlapping membership functions which must be defuzzified for determination of a crisp value that is meaningful to the fight control process. For example, if it was determined in the inference process that the nozzle angle had a degree of truth of being steep of 0.6 and a degree of truth of 0.4 that the angle is medium, the automatic flight control systems will not have enough information to be able to set the nozzle angle to a discrete value. Several methods have been developed to produce crisp values from the combined output values calculated during the inference process. The centroid (center of mass) method is an example of a popular defuzzification technique.

The above described fuzzy logic thrust vectoring control is combined with conventional aerodynamic flight control (AFC) by considering the total resultant vertical lift to be a combination of the thrust from thrust vectoring control and aerodynamic flight control systems. In other words, the total lift is the sum of thrust provided by two components: the first being from thrust vectoring (TV) and the second from aerodynamic flight control (AFC). Determining the ratio of thrust vectoring flight control to aerodynamic flight control required for a given hazardous situation allows for more flexible emergency flight control methods to help prevent mid-air collisions and crashes with ground based objects. The total lift required to avert a hazardous situation is calculated using the fuzzy logic process (fuzzification, rule evaluation, defuzzification) and input variables as previously described. Inference rules are defined for the output variable of total lift required in the same manner as for the previously described output of thrust vectoring nozzle angle.

Figure 3A:
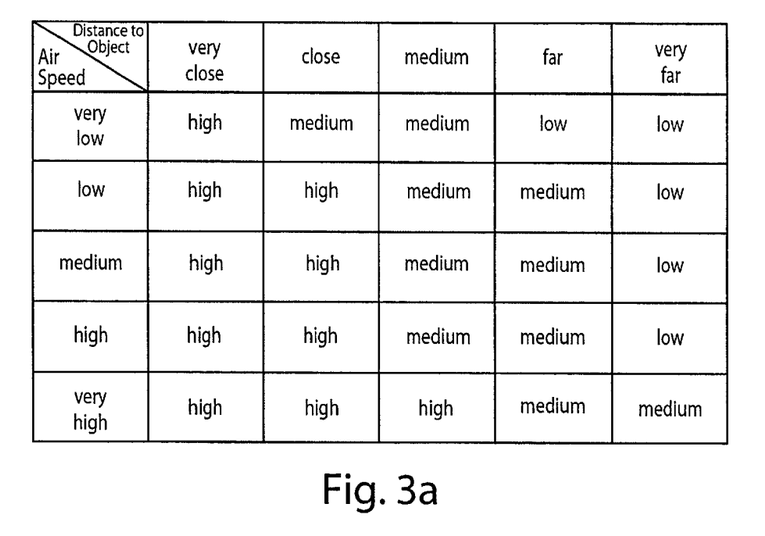
FIG. 3a shows an example of inference rule tables for determining the total lift required for a hazardous situation involving a possible collision.
Figure 3B:
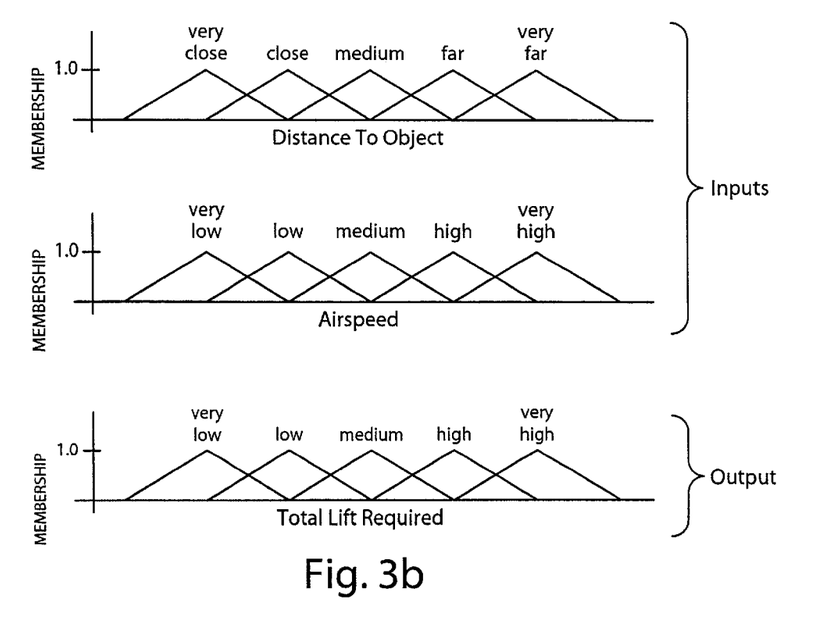
FIG. 3b shows triangular membership functions for input variables defining distance to an object and relative airspeed, and output variable of the total lift required.

FIG. 3a demonstrates example inference rules for calculation of the total lift required to avoid a current hazardous situation. The inference rules use distance from the object (i.e. to other aircraft or ground based object) and relative velocity/acceleration of the aircraft, with respect to the collision hazard, as inputs for the inference rule evaluation. FIG. 3b shows membership functions for distance from the object having categories of very close (VC), close (C), medium (M), far (F), and very far (VF). Airspeed of the aircraft has membership functions with categories of very low (VL), low (L), medium (M), high (H), and very high (VH). After calculation of a crisp value for the required lift, another fuzzy logic calculation is performed to determine the thrust vectoring flight control to total lift ratio ($lift_{TVFC}/lift_{TOTAL}$), which is the portion of lift from thrust vectoring control required to handle the current hazardous situation.

Figure 4A:
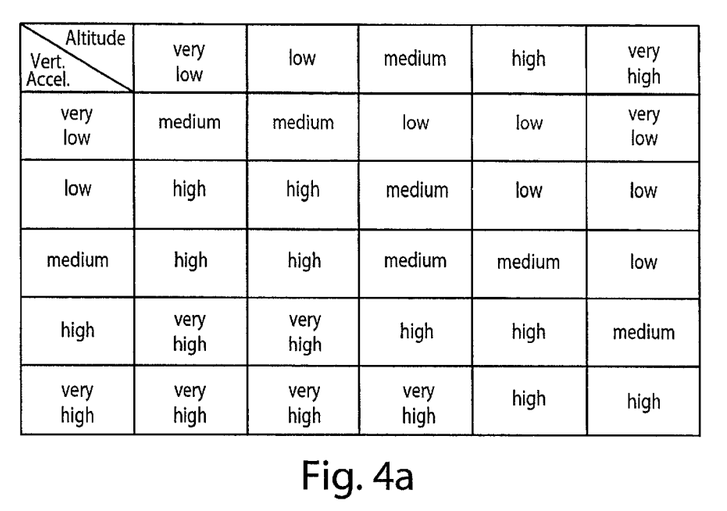
FIG. 4a shows an example of an inference rule table for determining the ratio between thrust vectoring lift and the total lift required.
Figure 4B:
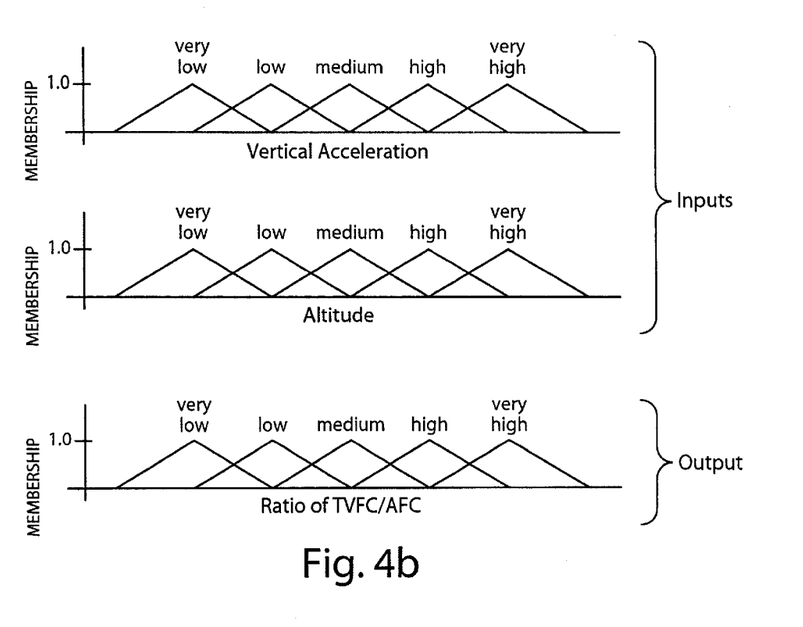
FIG. 4b shows triangular membership functions for input variables vertical acceleration and altitude, and output variable of the ratio of thrust vectoring flight control (TVFC)/ aerodynamic flight control (AFC).

As an example of the ($lift_{TVFC}/lift_{TOTAL}$) calculation for an aircraft experiencing a wind shear, the altitude and vertical acceleration of the aircraft are used in the fuzzy logic calculation. Vertical acceleration is a measured quantity representing the magnitude of the wind shear experienced by the aircraft. If the wind shear magnitude is large the aircraft will experience a large acceleration downward. FIG. 4a shows possible inference rules relating input categories of altitude and vertical acceleration with the output category of $lift_{TVFC}/lift_{TOTAL}$. Membership functions for altitude, and vertical acceleration, and $lift_{TVFC}/lift_{TOTAL}$ can be seen in FIG. 4b. The inference rules demonstrate the need for a greater thrust vectoring component (larger $lift_{TVFC}/lift_{TOTAL}$) as altitude decreases or vertical acceleration increases.

With the known $lift_{TVFC}/lift_{TOTAL}$ ratio, the portion of lift to be performed by the aerodynamic flight control (AFC) systems (i.e. $lift_{AFC}/lift_{TOTAL}$) will be the remainder of the total thrust required, that is:

$$lift_{AFC}/lift_{TOTAL}=1-lift_{TVFC}/lift_{TOTAL}$$

Alternatively, the $lift_{AFC}/lift_{TOTAL}$ ratio could have been determined from the fuzzy logic process, and the portion of lift required from the thrust vectoring systems would have been the remainder, that is:

$$lift_{TVFC}/lift_{TOTAL}=1-lift_{AFC}/lift_{TOTAL}$$

In determining these ratios, a fuzzy logic combined thrust vectoring and aerodynamic flight control is achieved. Thrust vectoring is used as appropriate to augment conventional control for emergency flight control corrections.

Figure 5:
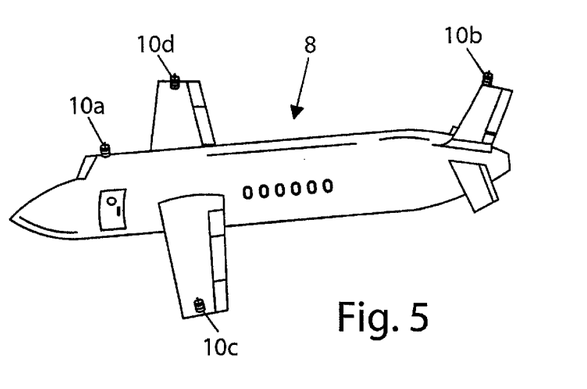
FIG. 5 shows a perspective view of an aircraft having GPS receivers located on the extremities of the aircraft.

The proposed invention uses the global positioning system (GPS) for position, heading, and speed input to the fuzzy logic controller (FLC). FIG. 5 shows the location of four GPS receivers on a typical aircraft 8. There are receivers mounted at the front 10a and rear 10b, and also the left and right wing tips 10c, 10d. These receivers have sufficient channels to allow continuous monitoring of all satellites in view (up to 12 for GPS). Multiplexing of channels may cause delays in locking time and update rate, which would be unacceptable for many emergency conditions. Input from these four GPS receiver locations can provide the FLC with data to calculate position, attitude (roll, pitch, and yaw), and heading. Angle of attack (angle between attitude and direction of flight) can also be calculated. Position, attitude, and heading information is updated at a sufficient rate to determine if the aircraft is in a hazardous condition such as possible collision, stall, spin, wind shear, etc.

Figure 6:
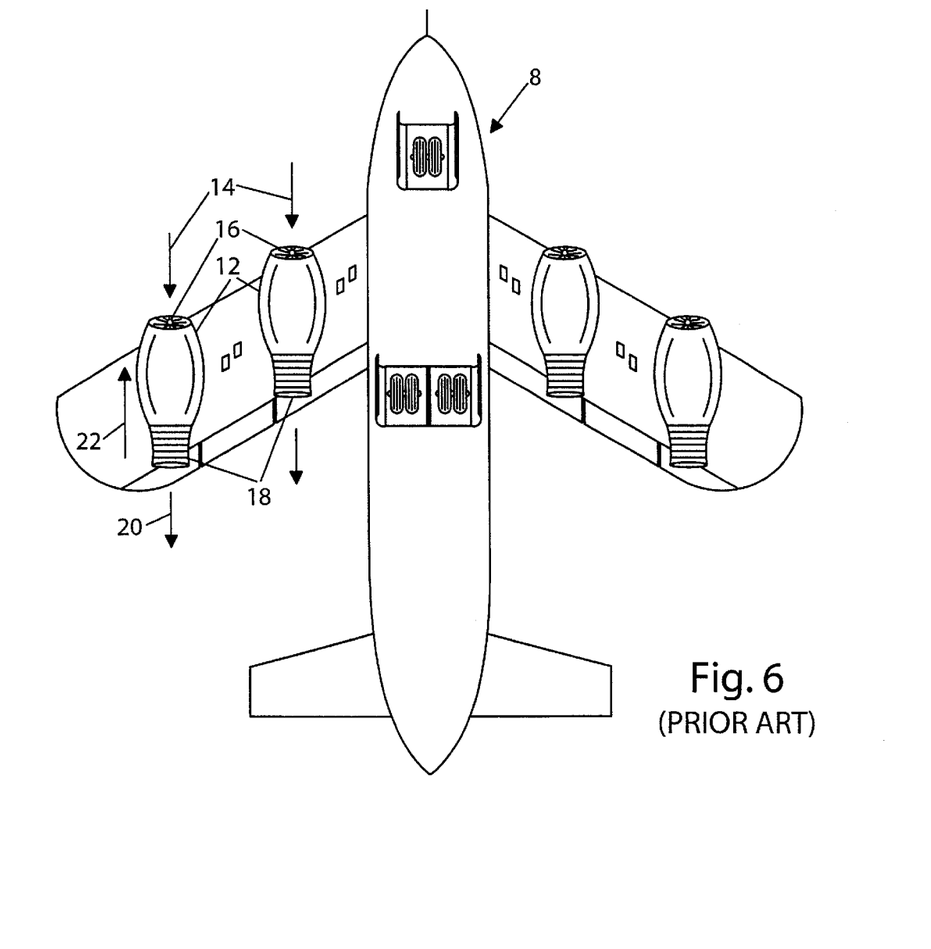
FIG. 6 shows a bottom view of a standard aircraft.

The bottom view of a typical four engine jet aircraft 8 is illustrated in FIG. 6. In conventional or aerodynamic flight control (AFC), the engines 12 provide thrust for the aircraft in a horizontal direction allowing air to flow over and under the wing (and other control surfaces) providing lift for the aircraft. Air input 14 to the engine at 16 is compressed and burned with the jet fuel. The expanding gases are propelled out the nozzles 18 producing thrust 20, which in turn produces a force on the aircraft 22 in the opposite direction. The majority of aircraft today have fixed nozzles, which produce thrust in primarily a horizontal direction. The nozzles of this invention are adjustable providing a thrust vectoring capability.

This invention uses both AFC and thrust vectoring flight control (TVFC) for emergency flight control measures. TVFC uses an adjustable nozzle or vane to redirect the engine thrust. FIG. 7a shows the adjustable engine nozzle in the position used for horizontal flight. The nozzle lies close to the horizontal axis of the engine 24. This position of the nozzle used in conjunction with standard control surfaces (flaps, ailerons, stabilizer, etc.) represents a configuration similar to most jet aircraft. In the horizontal flight mode, the nozzle 28 is directed in a horizontal direction providing only one component of thrust 30 also in a horizontal direction. FIG. 7b demonstrates the concept of a thrust vectoring adjustable engine nozzle. When the aircraft requires additional lift or emergency maneuvering (stall, wind shear, collision, etc.) the nozzle 32 can be redirected at a downward angle θ 34 with respect to the horizontal axis of the engine 24. The total thrust 36 at the angle θ provides a component of thrust in both the vertical 38 and horizontal 40 directions. The vertical component of thrust 38 provides greater lift to the aircraft than could be achieved by airflow over the control surfaces alone.

Figure 8:
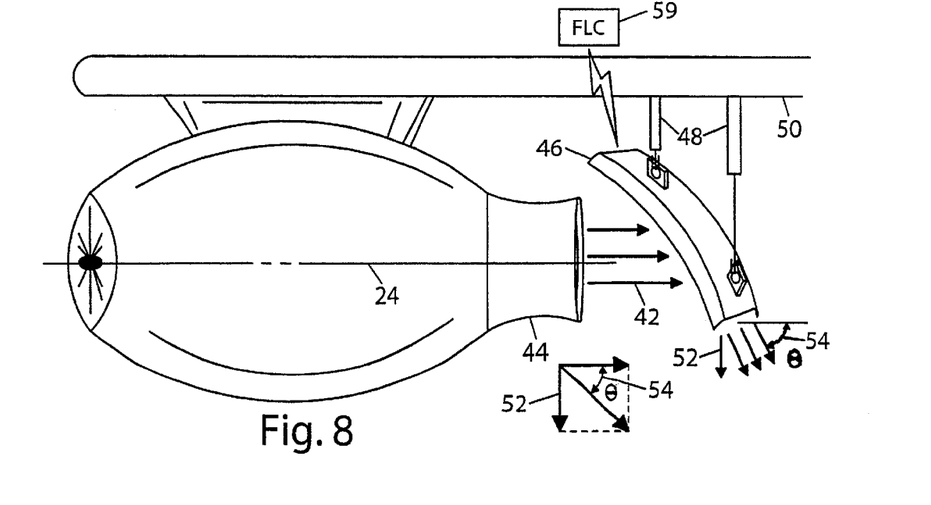
FIG. 8 shows a side view of an adjustable thrust vectoring nozzle incorporating a separate adjustable vane or panel.

In another embodiment of the invention (FIG. 8), thrust vectoring is accomplished with a vane 46 that is moved into the flow of exhaust to redirect the thrust of the engine 12. FIG. 8 demonstrates how the thrust 42 flows from the fixed nozzle 44 in a horizontal direction. When the fuzzy logic controller (PLC) 59 determines the aircraft 8 is in a hazardous situation, the thrust vectoring vane 46 is moved into place using actuators 48, which are attached to the wing 50. The thrust 20 is redirected at an angle θ 54 to the horizontal axis of the engine 24. This redirection of the thrust 20 now contributes a component of thrust in the vertical direction 52. The actuators can control the position at which the thrust vectoring vane 46 is positioned, controlling the angle θ 54, which directly relates to the magnitude of the thrust component in the vertical direction 52. FIGS. 7 and 8 demonstrate two-dimensional control methods, but the thrust vectoring systems may also be designed to provide a three-dimensional capability.

Figure 9:
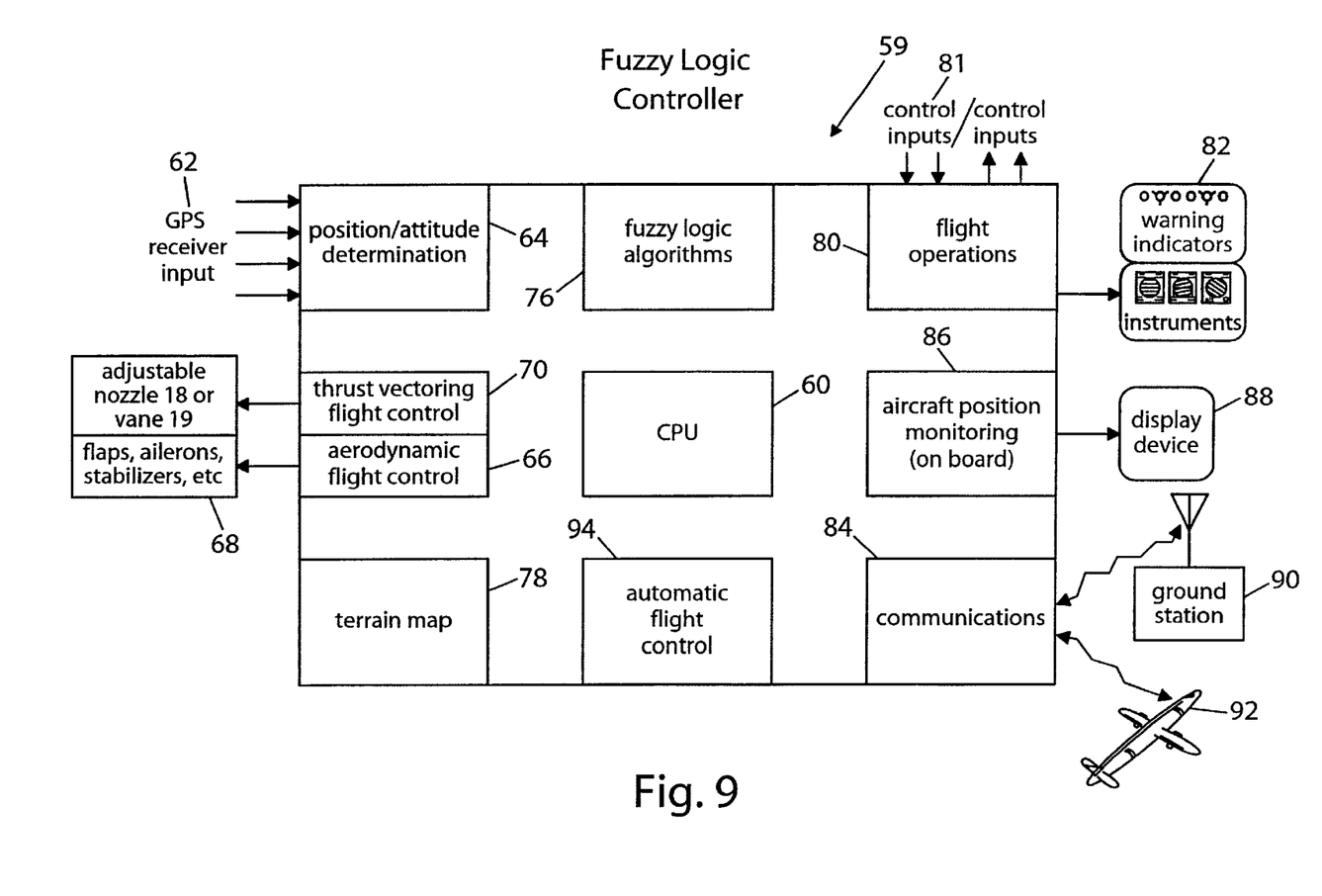
FIG. 9 shows a block diagram of the fuzzy logic controller and its various control and operational systems.

The FLC is the central component of the proposed system. The FLC may be a single system or a central computer with multiple embedded systems for individual functions (GPS, communications, terrain map, etc.). A block diagram of the FLC 59 is shown in FIG. 9. The CPU 60 is the core of the FLC, which executes the application and system level software for the emergency flight control and associated functions. Calculation of fuzzy logic algorithms 76 are performed by the CPU. The CPU has a microprocessor, memory (RAM and ROM), application/data storage devices, such as, but not limited to disk drives, input/output ports (for communication with the outside world), and other relevant hardware for implementation of the processing functions. This system could also be an off the shelf computer with at least all the hardware functions described above.

It is important to know the exact position, attitude, and speed of the aircraft at all times. It is not only important for the emergency flight control system proposed by this invention, but this information is also necessary in the normal flight operations of the aircraft. In FIG. 9 the GPS receiver input 62 used in this invention provides coordinate information to the position/attitude function 64 of the FLC. The aerodynamic flight control function 66 manipulates the control surfaces (flaps, ailerons, stabilizers, etc.) 68. The thrust vectoring flight control function 70 manipulates the adjustable nozzle (or vanes) of the thrust vectoring system when the FLC determines that an emergency situation exists. Thrust vectoring allows the capability of sudden changes in the flight path of the aircraft, which cannot be performed by the AFC system alone. In the event of an unexpected wind shear on takeoff or landing, AFC measures alone may not provide sufficient vertical lift to overcome the downward force of the wind shear. With automatic engagement of the TV nozzles in a downward manner, enough vertical thrust may be generated to prevent the aircraft from crashing into the ground. Another hazardous situation in which an aircraft may require a sudden change in flight path is a possible mid-air collision. In this scenario the aircraft may require an immediate correction in its flight path which could be in any direction. The fuzzy logic controller calculates the level of danger to be high and also determines the best corrective action to take. Due to the FLC's capability to react faster than the flight crew, many potentially fatal mid-air collisions could be averted.

Another feature of the FLC of this invention is the aircraft position monitoring function 86. This is an on board air traffic control (ATC) system used for collision avoidance. All aircraft in a given region will broadcast their position, using the communications subsystem 84, to all other aircraft 92 and/or to a ground control station 90. A ground control station accepts position information from all aircraft and broadcasts this information to other aircraft in the area. The ground station determines if a collision is possible and/or transmits position information permitting the individual aircraft to determine if a hazardous condition exists. Ground stations are not necessary if communications exists between all aircraft in the region. The position information received about the other aircraft in the region is displayed on a graphics device 88. The display device may be a two dimensional device displaying relative aircraft positions and identification information. As an alternative, the display device may be three dimensional, which gives the flight crew an immediate sense of depth perception. The aircraft position monitoring 86 function provides data to the fuzzy logic processing 76 to make determinations of any collision danger, which may exist. If a danger exists the flight crew is immediately notified and possible automatic emergency measures may be taken.

Another feature of this invention is the terrain map 78, which is a data base containing all obstacles which may present a danger to the aircraft. The terrain map is a geographic information system (GIS) containing the coordinates of hazards such as trees, mountains, buildings, towers, etc. in a given area. The terrain map works integrally with position information from the position/attitude function 64 and the FLC. Current position and heading information from the GPS receivers is compared to information stored in the terrain map 78. If a potentially hazardous situation is detected by the fuzzy logic controller, the flight crew is notified or the FLC can take immediate emergency measures to avert a possible disaster.

The FLC must interact with the normal flight operations 80 to coordinate the emergency actions and implement visual and audible warnings 82. Pilot inputs 81 to aircraft controls may be input variables to the fuzzy logic inference process 76. Such inputs may be helpful in determining if the aircraft may be in possible danger. For example, if the aircraft is approaching a mountain range and the pilot commands the aircraft to descend, the FLC would make a determination as to the level of danger that this command represents. If the altitude of the aircraft is not sufficient to clear the mountain while descending, the FLC will provide a warning to the flight crew or take immediate action. Emergency control measures without pilot input are performed by the automatic flight control function 94 in the FLC. Once the determination has been made (in the fuzzy logic process) that the current situation requires immediate action, the automatic flight control function sends the proper control information to the flight control AFC and TVFC functions 66, 70 and the proper warning indicators 82.

In summary one embodiment has been presented for implementing a fuzzy logic based emergency flight control system for aircraft. The system incorporates a thrust vectoring ability for providing thrust to complement the conventional flight control systems. A fuzzy logic controller provides for an ability to determine the magnitude of a hazardous situation and what actions should be take to correct the situation. The fuzzy logic controller provides for warning of the flight crew of hazardous situations and takes automatic corrective actions if necessary.

The inventions set forth above are subject to many modifications and changes without departing from the spirit, scope or essential characteristics thereof. Thus, the embodiments explained above should be considered in all respect as being illustrative rather than restrictive of the scope of the inventions as defined in the appended claims. For example, the present invention is not limited to the specific embodiments, apparatuses and methods disclosed for aircraft flight control. The present invention is also not limited to the use of GPS communication satellites and GPS receivers to determine locations throughout the system. The present invention is also not limited to any particular form of computer or computer algorithm.

We claim:

1. A fuzzy logic method for controlling an aircraft comprising:
   (a) obtaining input variables related to the aircraft, including:
      (1) obtaining at least one of altitude of the aircraft, wind shear magnitude in proximity of the aircraft, air speed of the aircraft, and proximity parameters of the aircraft to other aircraft and objects;
      (2) obtaining at least one of position, attitude, and heading of the aircraft; and
      (3) communicating the input variables to a fuzzy logic controller;
   (b) fuzzifying the input variables into input fuzzy sets by using the fuzzy logic controller;
   (c) obtaining fuzzified output variables from the fuzzified input variables;
   (d) using the fuzzified output variables to calculate crisp output values for controlling the aircraft; and
   (e) executing commands based on the crisp output values wherein the commands control the aircraft;
   wherein:
   (f) obtaining position, attitude, and heading of the aircraft further comprises:
      (1) locating global positioning system receivers at extremities of the aircraft;
      (2) using the global positioning receivers to communicate to global positioning system satellites; and
      (3) using received signals from the global positioning system satellites for determining at least one of position, attitude, and heading of the aircraft.

2. The fuzzy logic method for controlling an aircraft according to claim 1 wherein the input variables range in levels.

3. The fuzzy logic method for controlling an aircraft according to claim 2 wherein the range in levels includes at least a very low level, a low level, a medium level, a high level, and a very high level.

4. The fuzzy logic method for controlling an aircraft according to claim 2 wherein membership in the input fuzzy sets range from zero to one.

5. A fuzzy logic method for controlling an aircraft comprising:
   (a) obtaining input variables related to the aircraft, including at least one of position, attitude, and heading of the aircraft, and communicating the input variables to a fuzzy logic controller;
   (b) fuzzifying the input variables into input fuzzy sets by using the fuzzy logic controller;
   (c) obtaining fuzzified output variables from the fuzzified input variables;
   (d) using the fuzzified output variables to calculate crisp output values for controlling the aircraft;
   (e) using a thrust vectoring system coupled to the aircraft wherein the thrust vectoring system is angularly adjustable in thrust and provides thrust magnitude to the aircraft; and
   (f) executing commands based on the crisp output values wherein the commands control the aircraft;
   wherein:
   (g) obtaining position, attitude, and heading of the aircraft further comprises:
      (1) locating global positioning system receivers at extremities of the aircraft;
      (2) using the global positioning receivers to communicate to global positioning system satellites; and
      (3) using received signals from the global positioning system satellites for determining at least one of position, attitude, and heading of the aircraft.

6. The fuzzy logic method for controlling an aircraft according to claim 5 further comprising obtaining current thrust magnitude of the thrust vectoring system.

7. The fuzzy logic method for controlling an aircraft according to claim 5 further comprising obtaining current thrust angle of the thrust vectoring system.

8. A fuzzy logic method for controlling an aircraft comprising:
   (a) obtaining input variables related to the aircraft, including at least one of position, attitude, and heading of the aircraft, and communicating the input variables to a fuzzy logic controller;

(b) fuzzifying the input variables into input fuzzy sets by using the fuzzy logic controller;

(c) obtaining fuzzified output variables from the fuzzified input variables;

(d) using the fuzzified output variables to calculate crisp output values for controlling the aircraft; and (e) executing commands based on the crisp output values wherein the commands control the aircraft;

wherein:

(f) obtaining position, attitude, and heading of the aircraft further comprises:

(1) locating global positioning system receivers at extremities of the aircraft;

(2) using the global positioning receivers to communicate to global positioning system satellites; and (3) using received signals from the global positioning system satellites for determining at least one of position, attitude, and heading of the aircraft; and (g) at least some of the output variables are thrust vectoring flight control variables and at least some of the commands are thrust vectoring flight control commands.

9. The fuzzy logic method for controlling an aircraft according to claim 8 wherein output variables are thrust vectoring flight control variables and aerodynamic flight control variables and the commands are thrust vectoring flight control commands and aerodynamic flight control variables.

10. The fuzzy logic method for controlling an aircraft according to claim 8 wherein one of the thrust vectoring flight control variables is a thrust vectoring nozzle angle variable and one of the thrust vectoring flight control commands is a thrust vectoring nozzle angle command for controlling thrust nozzle angle of a thrust vectoring flight control system in controlling the aircraft.

11. The fuzzy logic method for controlling an aircraft according to claim 8 wherein at least some of the output variable are aerodynamic flight control variables and at least some of the commands are aerodynamic flight control commands.

12. The fuzzy logic method for controlling an aircraft according to claim 11 wherein one of the aerodynamic flight control variables is a rudder angle variable and one of the aerodynamic flight control commands is a rudder angle command for controlling a rudder of the aircraft in controlling the aircraft.

13. The fuzzy logic method for controlling an aircraft according to claim 11 wherein one of the aerodynamic flight control variables is a flap angle variable and one of the aerodynamic flight control commands is a flap angle command for controlling flaps of the aircraft in controlling the aircraft.

14. The fuzzy logic method for controlling an aircraft according to claim 11 wherein one of the aerodynamic flight control variables is an aileron angle variable and one of the aerodynamic flight control commands is an aileron angle command for controlling ailerons of the aircraft in controlling the aircraft.

15. The fuzzy logic method for controlling an aircraft according to claim 11 wherein one of the aerodynamic flight control variables is an engine thrust magnitude variable and one of the aerodynamic flight control commands is an engine thrust magnitude command for controlling engine thrust of at least one engine of the aircraft in controlling the aircraft in the emergency situation.

* * * * *